United States Patent
Fee et al.

[11] Patent Number: 5,978,130
[45] Date of Patent: Nov. 2, 1999

[54] DUAL-BAND FIBER OPTIC AMPLIFICATION SYSTEM USING A SINGLE PUMP SOURCE

[75] Inventors: John Fee; Niall Robinson, both of Plano; Shoa-Kai Liu, Richardson, all of Tex.

[73] Assignee: MCI Communications Corporation, Washington, D.C.

[21] Appl. No.: 08/931,500

[22] Filed: Sep. 16, 1997

[51] Int. Cl.⁶ .............................. H01S 3/16; H04B 10/00
[52] U.S. Cl. ........................ 359/341; 359/160; 359/345
[58] Field of Search .................................. 359/134, 160, 359/341, 345; 372/70, 71

[56] References Cited

U.S. PATENT DOCUMENTS

| | | | |
|---|---|---|---|
| 5,392,154 | 2/1995 | Chang et al. | 359/341 |
| 5,561,553 | 10/1996 | Marcerou et al. | 359/160 |
| 5,563,733 | 10/1996 | Mitsuda et al. | 359/341 |
| 5,721,635 | 2/1998 | Shigematsu et al. | 359/160 |

OTHER PUBLICATIONS

Patena et al, Optical Fiber Tech: Materials, Devices and Systems, vol. 1, #4, pp. 322–326, Oct. 1995; abst. only herewith.

Payne et al, 14th European Conf. on Opt. Commun., Sep. 15, 1988, pp. 49–53, vol. 292.

Townsend et al, Electronics Letters, vol. 27, #21, Oct. 10, 1991, pp. 1958–1959.

Galant et al, Sov. J. Quant. Elect., vol. 6, #10, Oct. 1976, pp. 1190–1195.

*Primary Examiner*—Nelson Moskowitz

[57] ABSTRACT

A dual-band optical amplifier uses a single pump source, such as a YAG solid-state laser emitting a pump light at a wavelength of 1047 nm, to provide amplification in both the 1550 nm and 1310 nm bands which are commonly encountered in the optical telecommunications environment. The pump light is fed into a fiber doped with praseodymium fluoride having Pr atoms in a +3 ionization state. These ions exhibit a ground state absorption that includes the 1047 nm wavelength. The same pump light is also coupled to a separate amplification fiber doped with trivalent erbium ions and ytterbium. This combination of ions also can be pumped to a metastable excited state by a 1047 nm wavelength source. Accordingly, when photon emission is generated, there is signal amplification in both fibers results.

19 Claims, 3 Drawing Sheets

DUAL-BAND FIBER OPTIC AMPLIFICATION SYSTEM USING A SINGLE PUMP SOURCE

FIELD OF THE INVENTION

This invention relates to optical telecommunications systems and devices and, in particular, an amplification system which uses optical fibers, doped with rare earth elements, and a single pump source to amplify optical signals of different wavelengths transmitted along an optical communications conduit.

BACKGROUND OF THE INVENTION

A communications network transports information or data among a number of locations. The information is usually presented to the network in the form of time-domain electrical signals and may represent any combination of telephony, video, or computer data in a variety of formats. To transport such information, a typical communications network consists of various physical sites (nodes) and information conduits (links) that interconnect the nodes. Each link carries information between nodes, while each node may contain equipment for combining, separating, transforming, conditioning, and routing the information signals.

Nodes are typically connected by many parallel links due to the need for capacity. While links in a network are currently being implemented by using electrical or microwave cables to carry RF, analog or digital signals, recent significant developments involving lasers, optical fibers, etc. in optical transmission elements enable network owners to replace or augment existing cable links. The main advantage of the optical transmission is extremely high modulation bandwidth of the optical carrier—orders of magnitude greater than with an electrical cable or microwave link. Thus, a present day optical carrier may be modulated with multi-gigabit-per-second data representing, for example, over 150,000 simultaneous telephone voice signals. Other significant advantages of the optical transmission are low attenuation, immunity to electrical noise, relatively good security of the transmitted signal and long distance transmission.

Despite the low attenuation of optical communications systems, an optical signal nevertheless requires amplification. The great distances spanned by fiber optic links often require the insertion of one or more optical amplifiers to strengthen the signal along the way. Fiber optic amplifiers are also needed before or after optical functions, such as filtering, for example, which may attenuate the signal even further.

Although many types of optical amplifiers are currently available, the most widely used is a fiber optic amplifier doped with rare earth elements, the most commonly used being dopant erbium, for example. When pumped at a suitable power and wavelength, the doped fiber amplifies an incoming data signal.

Operationally, a signal amplification optical fiber comprises a core portion to which a rare earth element has been added. An attenuated information carrying signal passing through such doped fiber is amplified as a result of the stimulated emission of the rare earth element. The rare earth element receives an energy emitted from a separate pump source for excitation—that is, the rare earth doped optical fiber is pumped at a pump wavelength of the rare earth dopant to cause population inversion of the dopant. This causes a signal propagating along the fiber at a signal wavelength to be amplified.

At the present time, two wavelength bands are prevalent in the transmission of signals in optical communications. Both bands are broadband, i.e., about 20–30 nm wide. One is simply known in the art as 1550 nm. This band is also referred to as the erbium band, because $Er^{3+}$ is the dopant used for operation in this range. The other band is known as 1310 nm. At these 1550 and 1310 nm wavelength bands, the optical fibers can be optimized for low attenuation and dispersion characteristics.

It is worth noting that at the present time fiber optic amplifiers are separately designed and constructed for the 1550 band and the 1310 band. In particular, the current state of the art requires two pump sources for increasing signals in these two bands. This is because the erbium-doped amplifiers are not suited for amplifying optical signals in the 1310 band. Similarly, praseodymium doped ($Pr^{3+}$) amplifiers, which amplify optical signals in the 1310 band, cannot boost optical signals having a wavelength within the 1550 nm range.

The present and foreseeable trend in the fiber optic communications suggests the use of multiple optical carriers utilizing a wavelength division multiplexing occupying both 1310 nm and 1550 nm bands along the same fiber link. A need, therefore, exists for an optical amplifier which uses a single pump source to provide an amplification in more than one band along the same fiber link.

SUMMARY OF THE INVENTION

The inventive fiber optic amplification system includes a laser illumination source for providing a pump beam to excite a dopant in a doped fiber. A first fiber optic conduit, doped with a first dopant, and a second fiber optic conduit, doped with a second dopant, are optically coupled to the laser illumination source. The conduits receive the pump beam and amplify, within each conduit, two information carrying signals each having a given wavelength. The amplification results from the excitation of the dopants by the pump beam generated by the laser illumination source. That is, the dopant ions are excited by the photons of the pump beam into a higher energy level and then relax, thereby emitting radiation at the respective wavelengths of the two information carrying signals.

In accordance with an aspect of the present invention, one dopant includes a concentration of praseodymium fluoride with praseodymium atoms in a +3 ionization state, while the second dopant includes a concentration of trivalent erbium ions and ytterbium.

In accordance with another aspect of the present invention, the laser illumination source includes a Ytterbium-Aluminum-Garnet (YAG) solid-state laser emitting radiation at a wavelength of substantially 1047 nanometers (nm).

In accordance with yet a further aspect of the present invention, one of the two information carrying signals has a wavelength within a band of substantially 1310 nanometers (nm) while the other of the two information carrying signals has a wavelength within a band of substantially 1550 nanometers (nm).

BRIEF DESCRIPTION OF THE DRAWINGS

The above-mentioned as well as additional features of the present invention will be evident and more clearly understood when considered in conjunction with the accompanying drawings, in which.

In all Figures, like reference numerals represent same or identical components.

DESCRIPTION OF THE INVENTION

Figure 1:
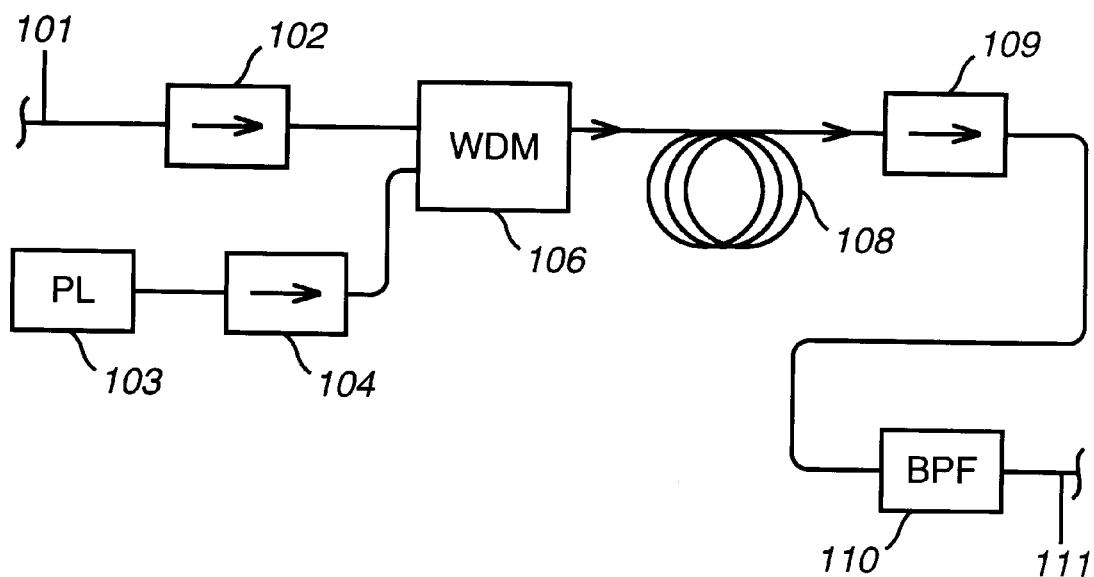
FIG. 1 shows a block diagram of a typical amplification system in an optical communications environment.

A typical amplifying system is described, for example, in U.S. Pat. No. 5,440,420 to Mori et al. As shown in FIG. 1, an optical transmission fiber 101 is connected to a wavelength division multiplexer 106 at the light-incident side thereof through an optical isolator 102. A pump laser 103 is also connected to the light-incident side of the wavelength division multiplexer 106 through an optical isolator 104. An amplifying optical fiber 108 is connected to the wavelength division multiplexer 106 at its light-outgoing side. At the other end, the optical fiber 108 is coupled to an optical isolator 109, which is connected, through a band pass filter 110, to an optical fiber 111 for transmission along the main link. The optical transmission fibers 101 and 111 are the single mode fibers for transmitting a signal laser beam falling within either the 1550 or 1310 band.

The operation of an optical amplifier is similar to that of a laser in that an optical signal is amplified when it passes through the doped region of the optical amplifier. In contrast to the laser, however, the signal does not bounce off the reflection mirrors, but instead passes only once through the gain medium. Still, the signal can be amplified more than a thousand times amplification after just a single pass.

In an optical transmission fiber used in the telecommunications environment, two wavelength bands exhibit low signal attenuation and are, therefore, advantageous to the propagation of the signal. As stated previously, one band is at 1310 nm and the other at 1550 nm. Each band is around 20 or 30 nanometers in width. Naturally, the ideal regions for amplification are within those bands. If the signal is at 1550 nm, an amplification device must provide gain at that particular wavelength, i.e., within that region. Similarly, if the signal wavelength is at 1310 nm, a device is needed that amplifies at 1310 nm, i.e., within that region.

Figure 2:
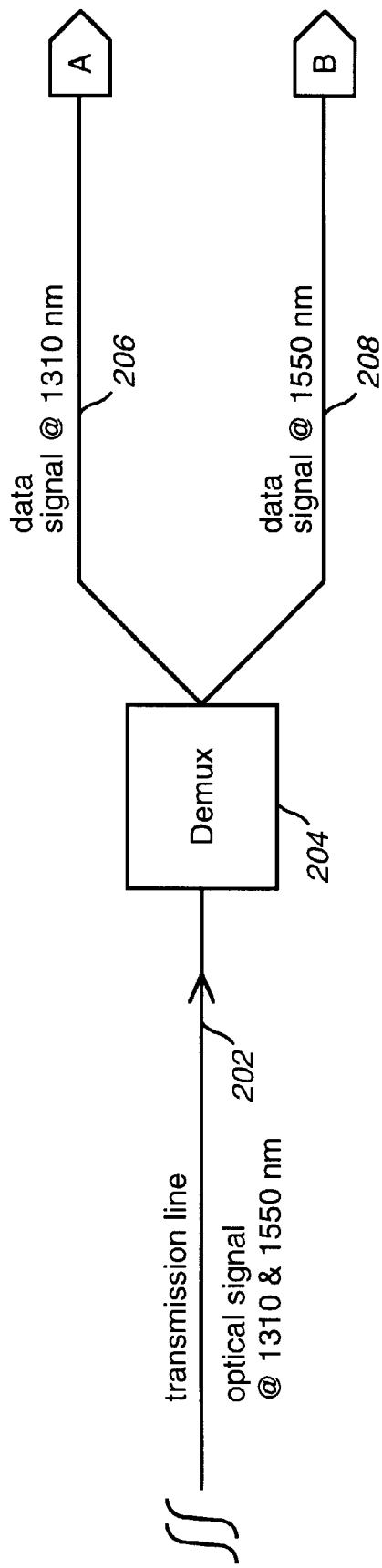
FIG. 2 shows a block diagram of a data signal entering an initial stage of an amplification system in accordance with one aspect of the present invention.
Figure 3:
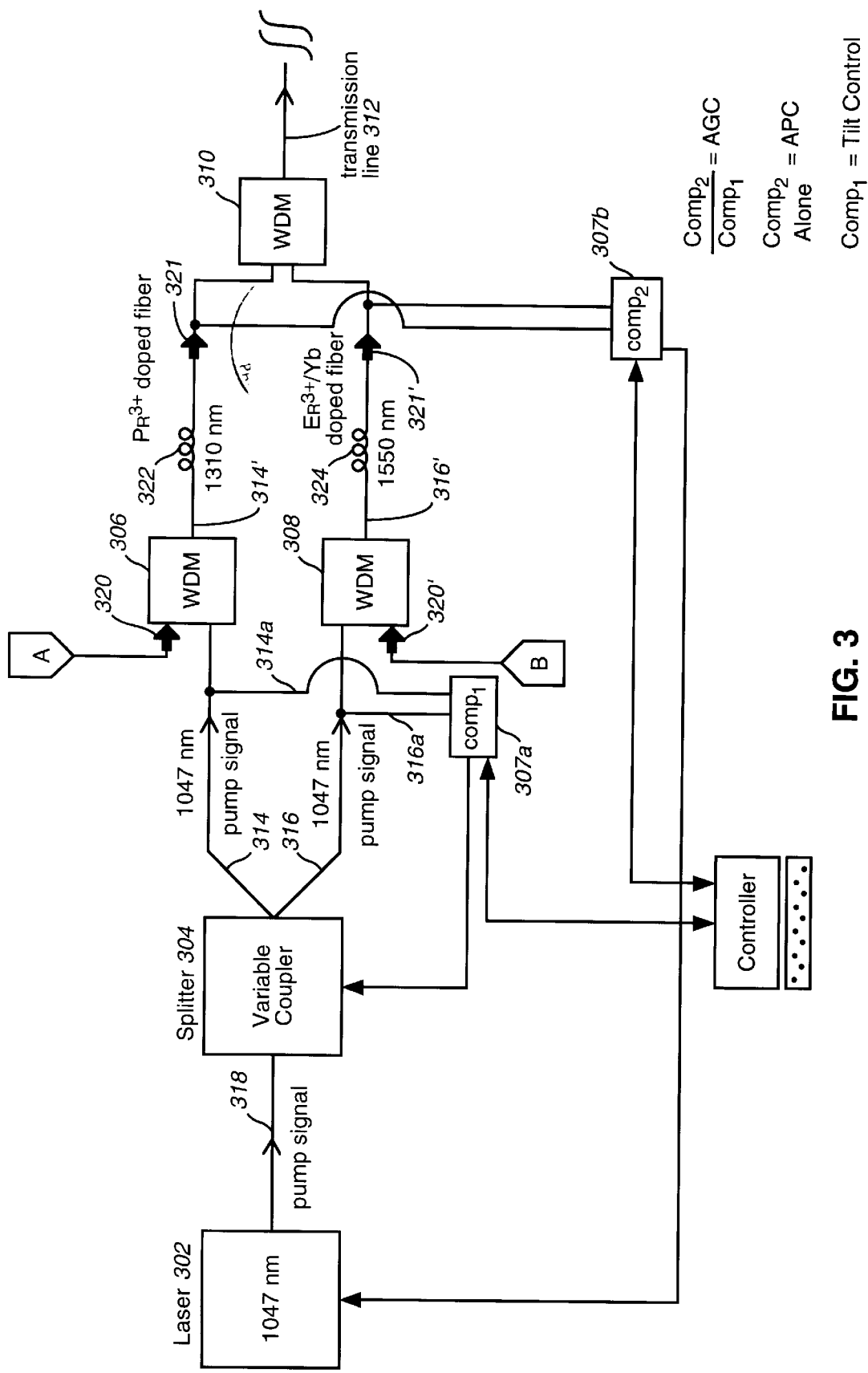
FIG. 3 shows a block diagram of the signal amplification system in accordance with one embodiment of the present invention.

FIGS. 2 and 3 illustrate an embodiment of the present invention. As shown in FIG. 2, transmission line 202 carries optical signals having wavelengths at approximately 1310 nm and 1550 nm. As is well known, these modulated optical signals carry information such as data, video or voice. For this discussion, assume the signals travel along the same line in the same direction.

As further shown in FIG. 2, the optical signals enter a conventional optical demultiplexer 204. Similar to its electrical counterpart, demultiplexer 204 separates one signal into two. As shown, these separated signals travel along two fiber lines 206, 208. The wavelength of one of these data signal is at substantially 1310 nm (line 206), while the wavelength of the other data signal is at substantially 1550 nm (line 208). Inasmuch as the operation of optical demultiplexer 204 is well known in the art, it will not be further discussed.

FIG. 3 is a continuation of FIG. 2. In particular and according to one embodiment of the present invention, the pump source includes a readily available Ytterbium-Aluminum-Garnet (YAG) solid-state laser 302 for oscillating an excitation laser beam having a wavelength λ of approximately 1047 nm. An exemplary output of this laser operating in a continuous mode is about 2 watts.

The output of the pump laser is connected to a splitter 304 via a fiber line 318. Thus, a pump light (or radiation) of 1047 nm wavelength travels along line 318 to optical splitter 304. Splitter 304 is a variable coupler that, depending on the gain and output power of each wavelength window, substantially evenly divides the pump light between the two fiber lines 314 and 316. The resulting two pump light beams at 1047 nm enter Wavelength Division Multiplexers (WDM) 306, 308. The wavelength division multiplexers may be prepared by heating and fusing two optical fibers, one superimposed on the other. To control the output from splitter 304, the respective signals carried on fiber lines 314 and 316 are fed to a comparator 307a via corresponding lines 314a and 316a. Comparator 307a then compares the signals and provide a feedback to splitter 304. Thus, the gain tilt can be readily adjusted by varying the ratio of the signals fed back by comparator 307a to splitter 304.

To further control the overall power of the circuit, given the fact that signals from sources A and B are not affected by comparator 307a, a second comparator 307b is provided further along the circuit and more specifically as shown in FIG. 2 being to connected to fiber lines 314' and 316' after isolators 321 and 321', respectively. The output from comparator 307b is provided as a feedback to laser source 302 to thereby control the amount of power output thereby. Thus situated, comparator 307b controls, as a ratio, the respective outputs from isolators 321 and 321'. It therefore provides automatic power control (APC) functionality. Accordingly, comparator 307b, together with comparator 307a, provides gain control separately for each of legs 314' and 316'. Automatic gain control (AGC) therefore is readily accomplished thereby.

As further shown in FIG. 3, the 1310 nm signal, which was demultiplexed per shown in FIG. 2, enters WDM 306 via an optical isolator 320. As known in the art, optical isolator 320, commonly used with fiber amplifiers, prevents unwanted reflections and lasing effects by preventing the light from counter-propagating along the optical fiber. Similar to the 1310 nm signal, the 1550 nm signal is input to WDM 308 via an optical isolator 320'. WDMs 306 and 308 combine the pump light and information carrying signals within the same fiber, which is doped accordingly for amplification.

When energy in the form of a pump laser light is supplied to a doped fiber, the doped fiber becomes an amplifier. So, once the doped fiber is illuminated with the pump light which is typically at a different wavelength than the signal beam, the amplification of the information carrying signal takes place. The amplifier can amplify any signal put through it, as long as the signal falls within its predetermined band.

For the amplification to occur, however, the pump light has to be at certain predetermined wavelengths. In an erbium-doped fiber amplifiers, pump lights at various wavelengths may be used for signal excitation. It has been found that a pump light wavelength of around 980 nm, 1480 nm, etc. is sufficient to provide amplification as high as 40 dB. The praseodymium-doped amplifier, however, must be pumped at different wavelengths than the erbium-doped one, so that the pump light wavelengths of the two doped amplifiers do not overlap.

In one aspect of the present invention, one of the pump wavelengths is at 1047 nm for the praseodymium-doped fiber amplifier. To achieve the pump light wavelength overlap, another element, i.e., ytterbium, is added to the erbium-doped fiber. As a result, the 980 nm band, which is used to pump the erbium ions, becomes broader, i.e., the 980 nm band increases to about 80 nanometers across and becomes very broad. Consequently, this band includes the 1047 nm wavelength used in the praseodymium-doped fiber amplifier. Accordingly, both the praseodymium-doped and erbium/ytterbium-doped amplifiers can be pumped at the 1047 nm wavelength.

The doped fiber is essentially a section of a fiber spliced into the path of the optical signal that is to be amplified. The fiber material contains a low concentration of a rare earth element in accordance with one aspect of the present invention. The amplifying optical fiber 322 is obtained by adding a praseodymium fluoride to its core portion. That is, fiber 322 contains a praseodymium fluoride with praseodymium atoms in a +3 ionization state ($Pr^{3+}$). Fiber 324, in the meanwhile, has some concentration of trivalent erbium ions and ytterbium ($Er^{3+}$/Yb). Optical isolators 321 and 321' are inserted after the doped regions of fibers 322 and 324, respectively.

The laser information carrying signals are amplified as a result of the stimulated emission of the praseodymium and erbium/ytterbium dopant combinations in fibers 322 and 324, respectively. The pump light drives the rare earth atoms into excited states. That is, when a pumping light is input to the doped fibers in accordance with the present invention, dopant ions are excited by pump photons into a higher energy level. When an information carrying signal is input to the optical fiber having dopant atoms excited up to this high energy level, a large proportion of the dopant ions in the higher energy levels relax. This results in the direct transition of the dopant ions to their ground state, thereby effecting emission of photons, i.e. the emitting of radiation at the two wavelengths of the two information carrying signals. The power of the signal light is thus gradually increased along the optical fibers to effect amplification of the information carrying signals.

After passing through the doped regions, the signals are fed into another WDM 310, while the pump light substantially dissipates. Following the processing by WDM 310, the information carrying signals are combined in a single optical transmission line 312 for subsequent transmission to a site, for example.

While FIG. 3 shows the 1310 nm and 1550 nm signals being transmitted in the same direction, it is understood that this is not required by the present invention. For example, optical isolators in one of the fiber lines can be reversed. Further, with a minor connection change in a WDM, the information carrying signals can travel in opposite directions along the two fiber lines, or within the same transmission line, such as transmission line 312 or 202 (FIG. 2).

The advantages of the present invention should now be fully apparent in light of the above description. Among other things, the present invention offers compactness and cost effectiveness because only a single pump source is needed to provide amplification of optical signals in two separate optical bands.

Since those skilled in the art can modify the disclosed specific embodiment without departing from the spirit of the invention, it is therefore intended that the claims be interpreted to cover such modifications and equivalents.

What is claimed is:

1. A fiber optic amplification system for use in an optical communications environment, comprising:
   a laser illumination source for providing a pump beam to excite a dopant in a fiber doped therewith; and
   a first fiber optic conduit doped with a first dopant and a second fiber optic conduit doped with a second and different dopant, said first and second conduits each optically coupled to said laser illumination source for receiving said pump beam, two information carrying signals each having a given different wavelength and provided to a corresponding one of said first and second conduits, ions of said first and second dopants being excited by said pump beam into a higher energy level and then relax so that radiation is emitted at the respective given wavelengths for said two information carrying signals.

2. The system according to claim 1, wherein said first dopant comprises a concentration of praseodymium fluoride with praseodymium atoms in a +3 ionization state.

3. The system according to claim 1, wherein said first dopant comprises a concentration of trivalent erbium ions and ytterbium.

4. The system according to claim 1, wherein said laser illumination source comprises a Ytterbium-Aluminum-Garnet (YAG) solid-state laser.

5. The system according to claim 4, wherein said YAG solid-state laser emits radiation at a wavelength of approximately 1047 nanometers (nm).

6. The system according to claim 1, further comprising:
   a variable optical signal splitter optically coupled to and located between said laser illumination source and said first and second conduits, said signal splitter dividing said pump beam into two pump beams having substantially equal power for transmission within each of said first and second fiber optic conduits.

7. The system according to claim 6, further comprising:
   a pair of wavelength division multiplexers each optically coupled to and located between said signal splitter and said first and second conduits, said pair of wavelength division multiplexers combining each of said two information carrying signals with each of said two pump beams for transmission along each of said first and second fiber optic conduits.

8. The system according to claim 1, further comprising:
   at least one optical isolator located in each of said first and second conduits for preventing unwanted reflections and lasing effects therein.

9. The system according to claim 1, further comprising:
   a wavelength division multiplexer coupled to each of said first and second conduits for combining each of said two information carrying signals propagating therewithin.

10. The system according to claim 1, wherein a first of said two information carrying signals has a wavelength within a band of substantially 1310 nanometers (nm) and a second of said two information carrying signals has a wavelength within a band of substantially 1550 nanometers (nm).

11. The system according to claim 1, wherein said two information carrying signals each propagate in the same direction along said first and second conduits.

12. The system according to claim 1, wherein said two information carrying signals propagate in respective different directions along said first and second conduits.

13. A fiber optic amplification system comprising:

a laser source for providing a light beam to excite a dopant in an optical fiber doped therewith;

an optical splitter coupled to said laser source for dividing said light beam into two light beams;

a pair of fiber optic conduits doped with different respective dopants each optically coupled to said optical splitter for accepting one of said pair of light beams, each of said light beams being combined with an information carrying signal having a different given wavelength, ions of said respective dopants being excited by said light beam into a higher energy level so that the information carrying signal in each of said pair of fiber optic conduits is amplified when the respective excited dopants relax; and a wavelength division multiplexer optically coupled to the outputs of said pair of fiber optic conduits for combining said amplified information carrying signals for subsequent transmission in a single optical transmission line.

14. The system of claim 13, further comprising:

a pair of wavelength division multiplexers each having an input coupled to said optical splitter and an output optically coupled to a corresponding one of said pair of fiber optic conduits.

15. The system according to claim 13, wherein one of said respective dopants comprises a concentration of praseodymium fluoride with praseodymium atoms in a +3 ionization state.

16. The system according to claim 13, wherein one of said respective dopants comprises a concentration of trivalent erbium ions and ytterbium.

17. The system according to claim 13, wherein said laser illumination source comprises a Yfterbium-Aluminum-Garnet (YAG) solid-state laser.

18. The system according to claim 17, wherein said YAG solid-state laser emits radiation at a wavelength of approximately 1047 nanometers (nm).

19. The system according to claim 13, wherein one of said two information carrying signals has a wavelength within a band of substantially 1310 nanometers (nm) and the other of said two information carrying signals has a wavelength within a band of substantially 1550 nanometers (nm).

* * * * *